3,401,072
MACHINE FOR ASSEMBLING STRIPS OF FASTENERS AND METHOD OF ASSEMBLING

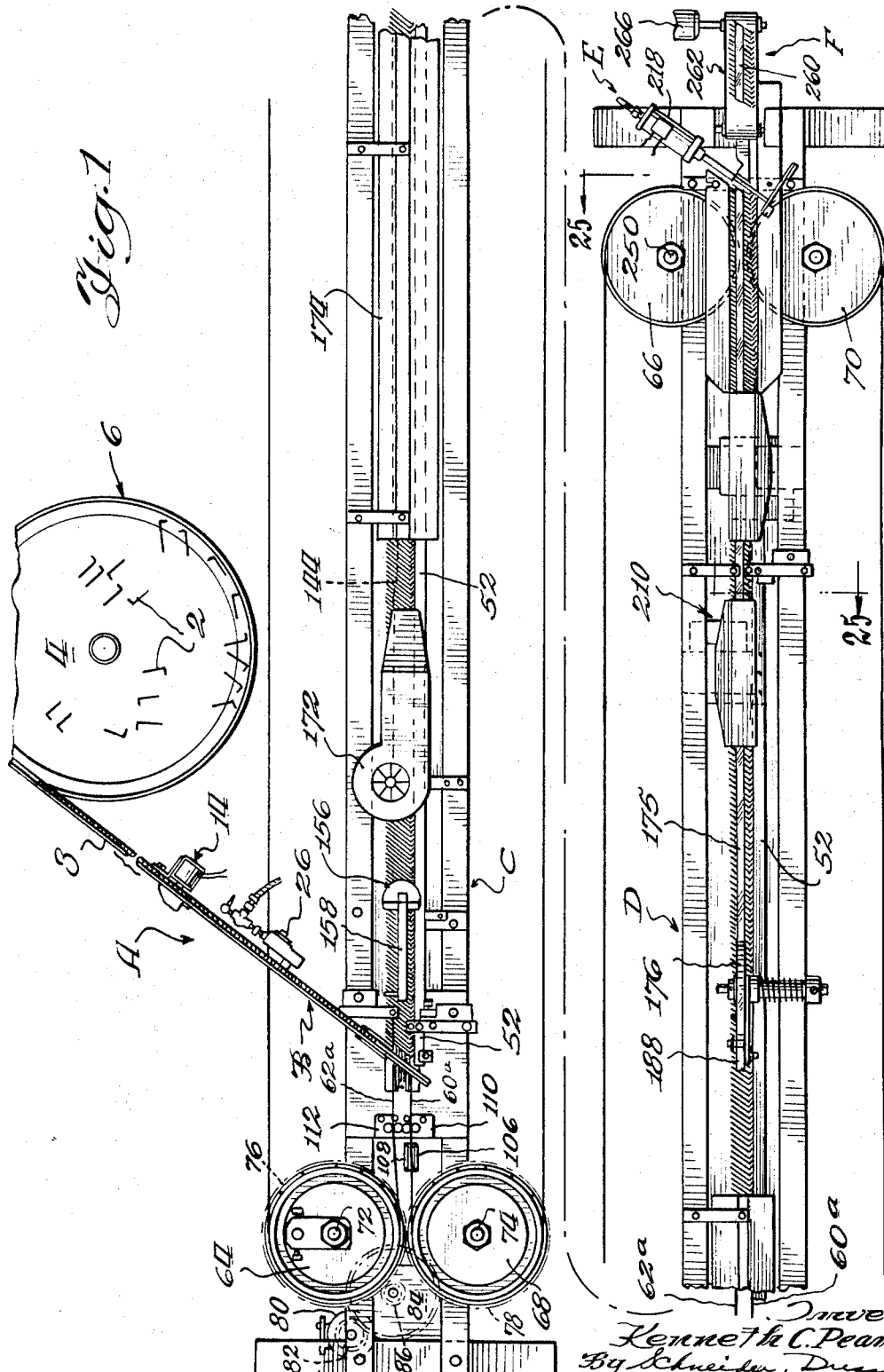

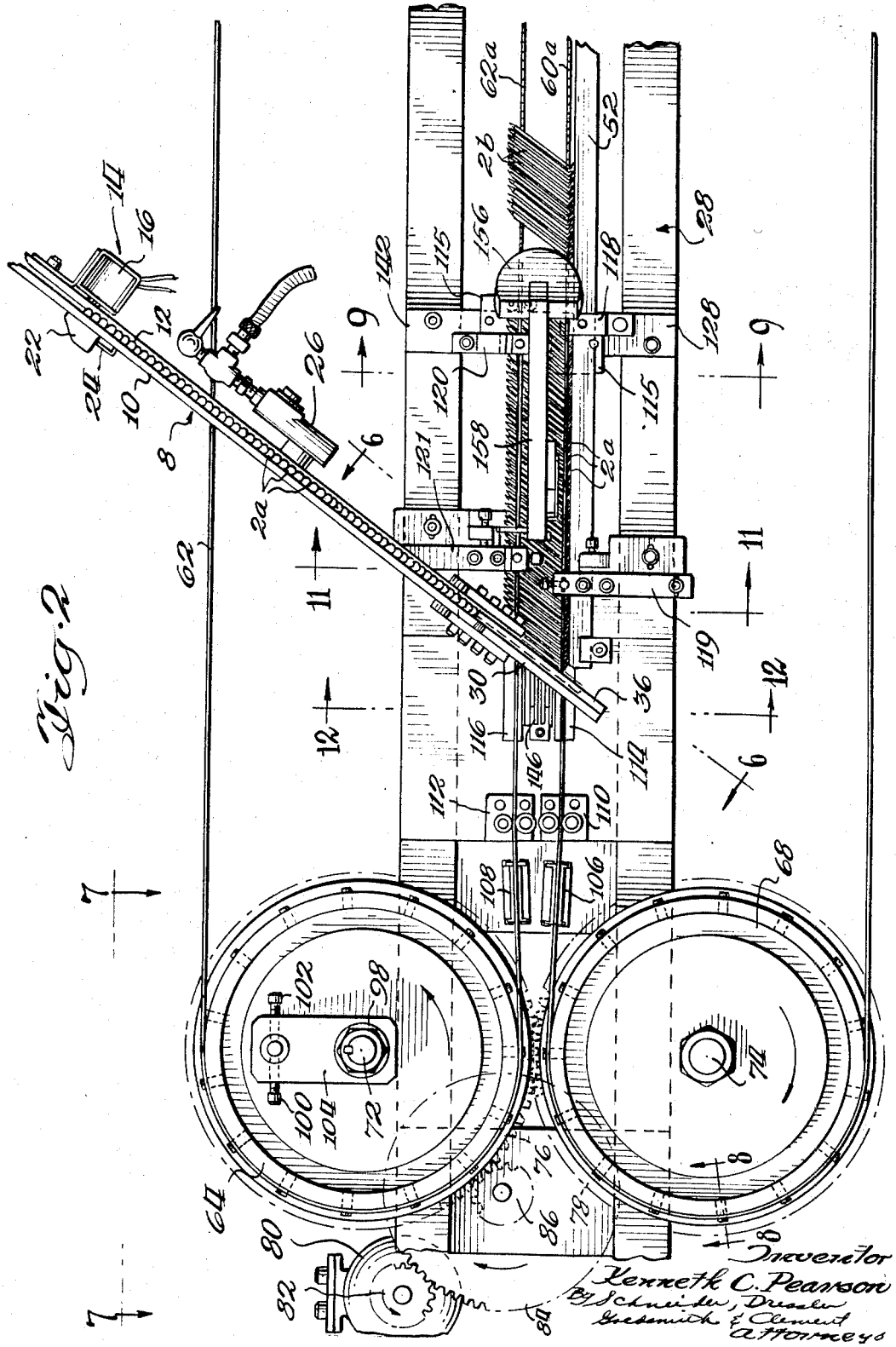

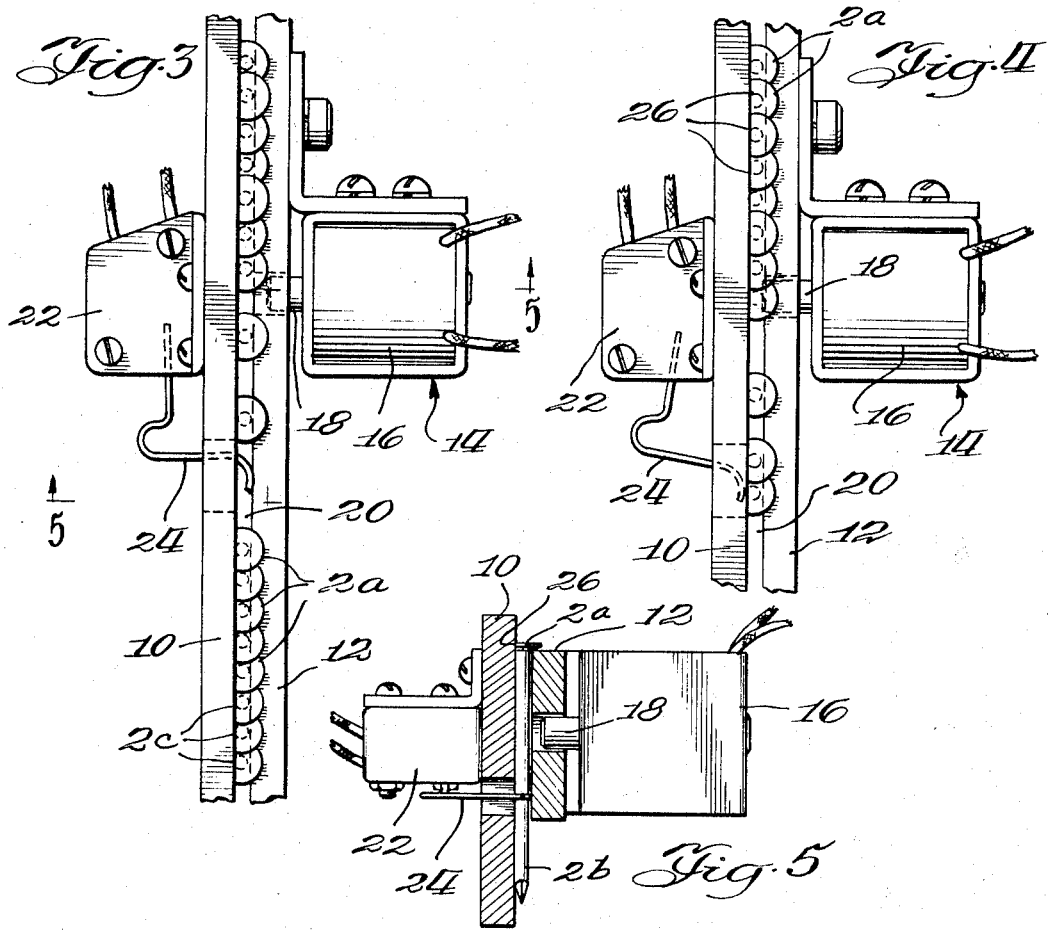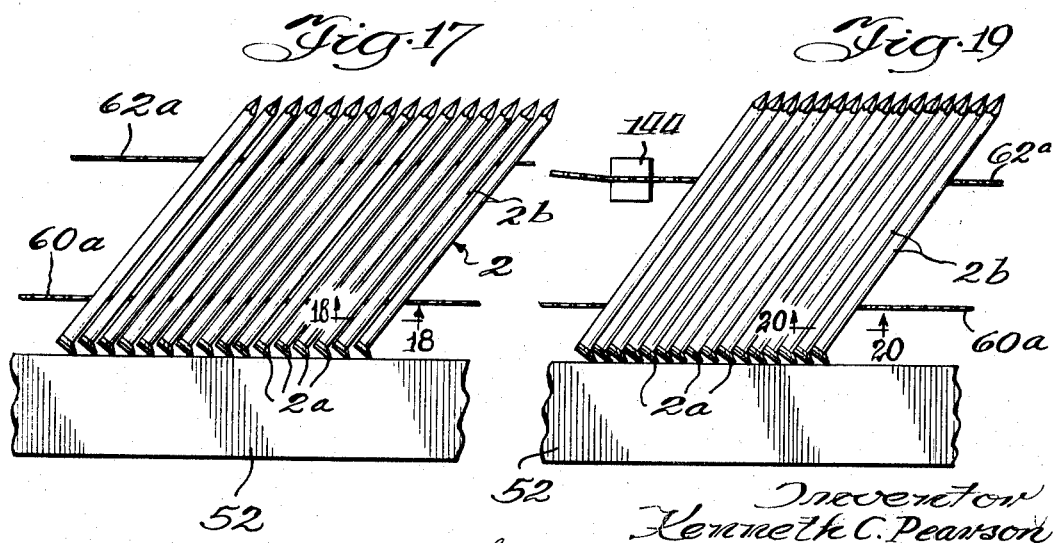

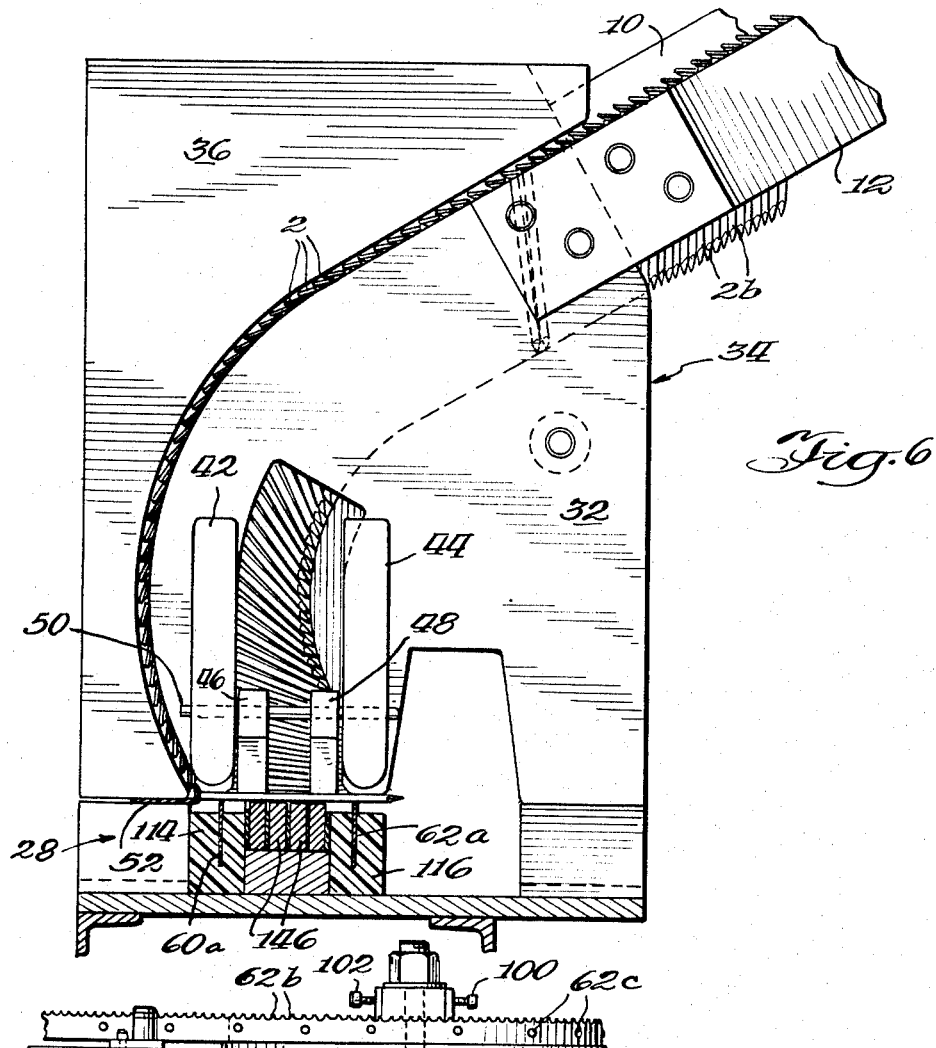
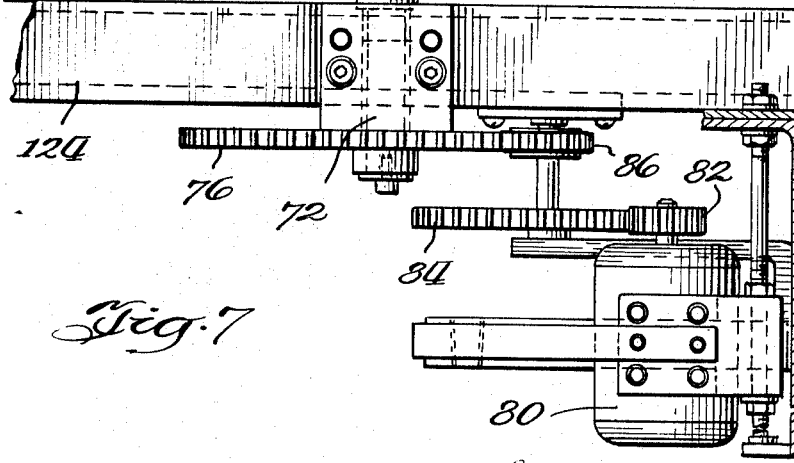

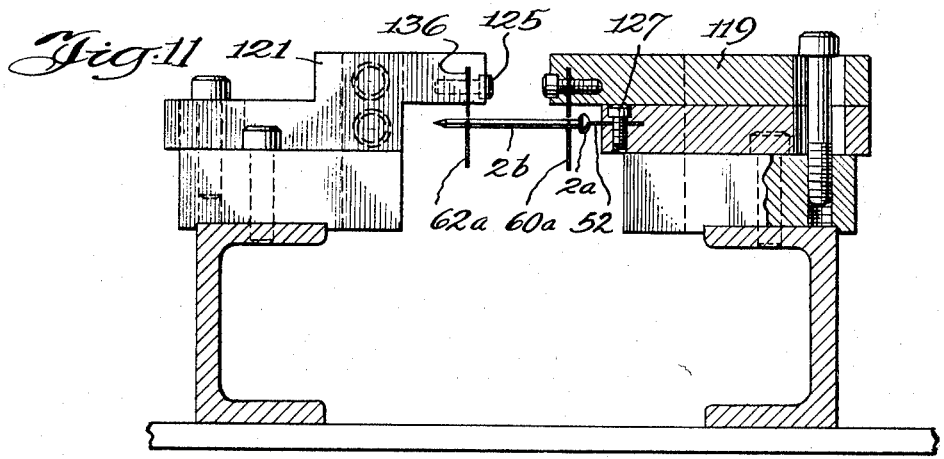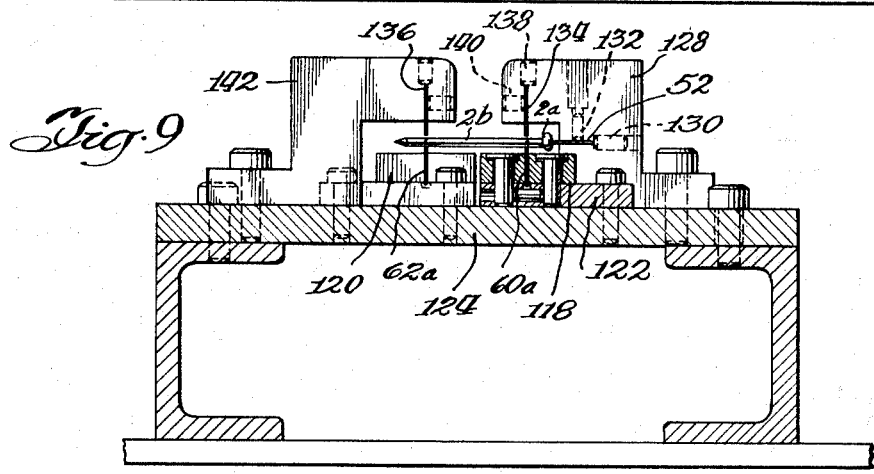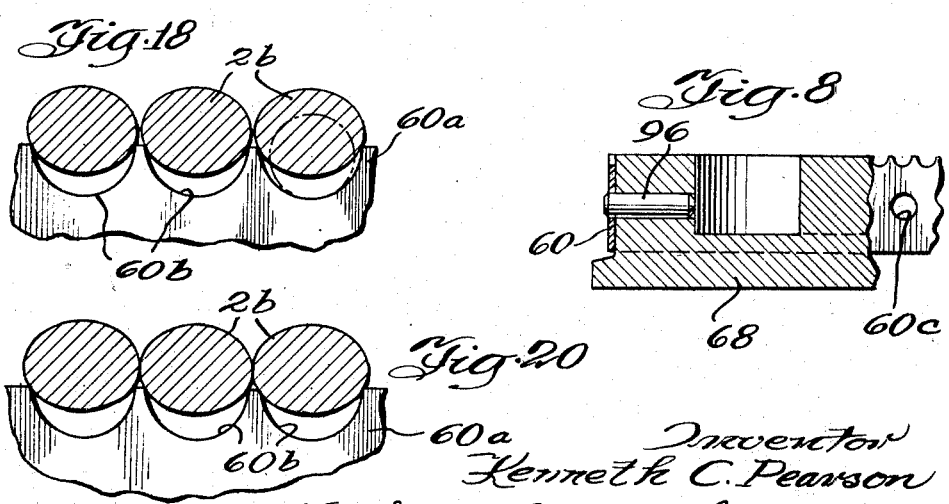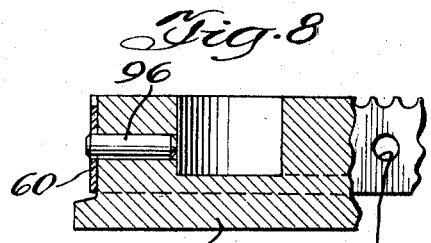

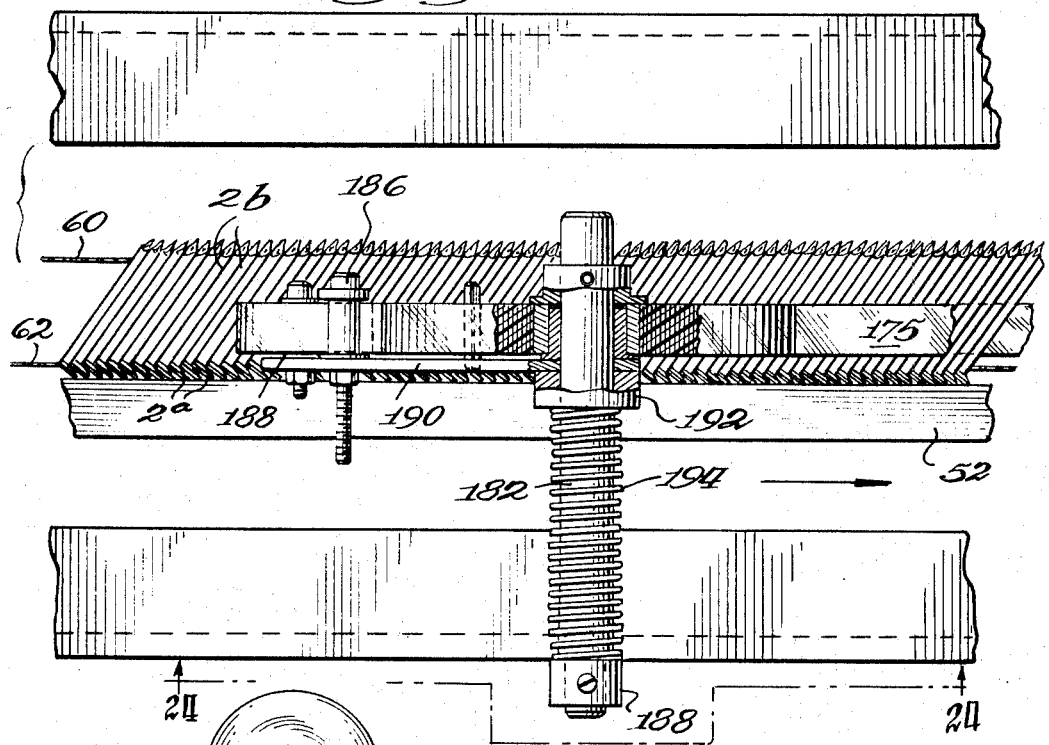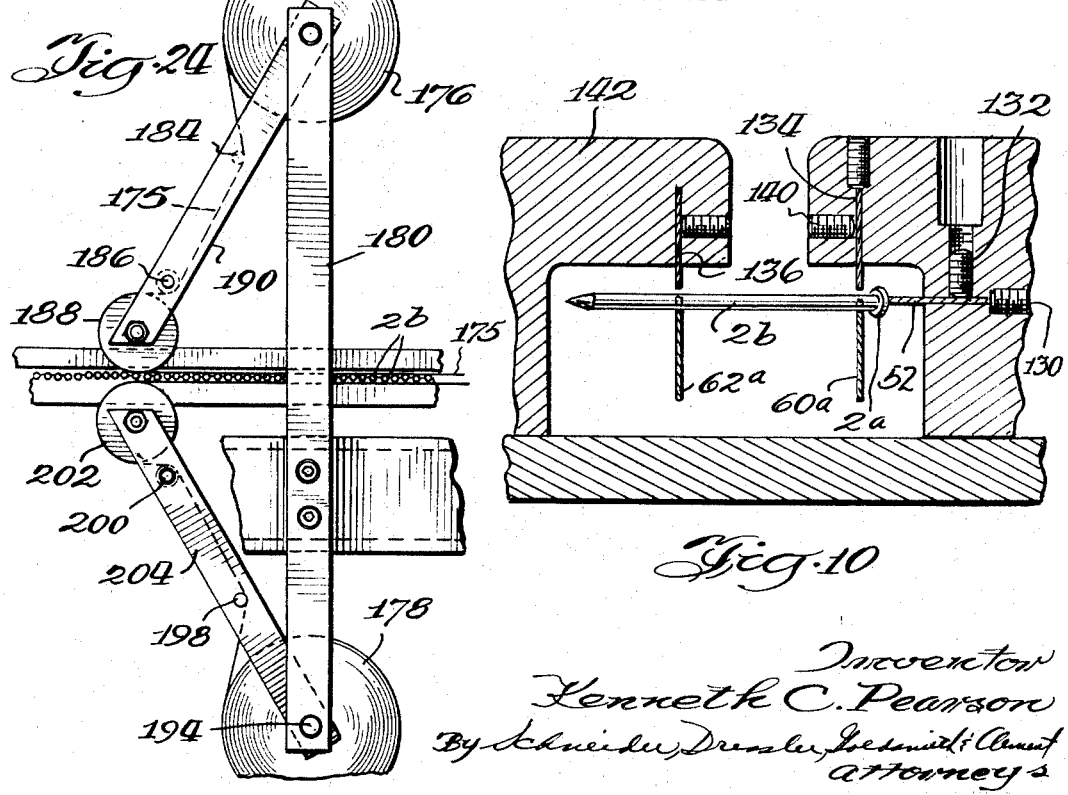

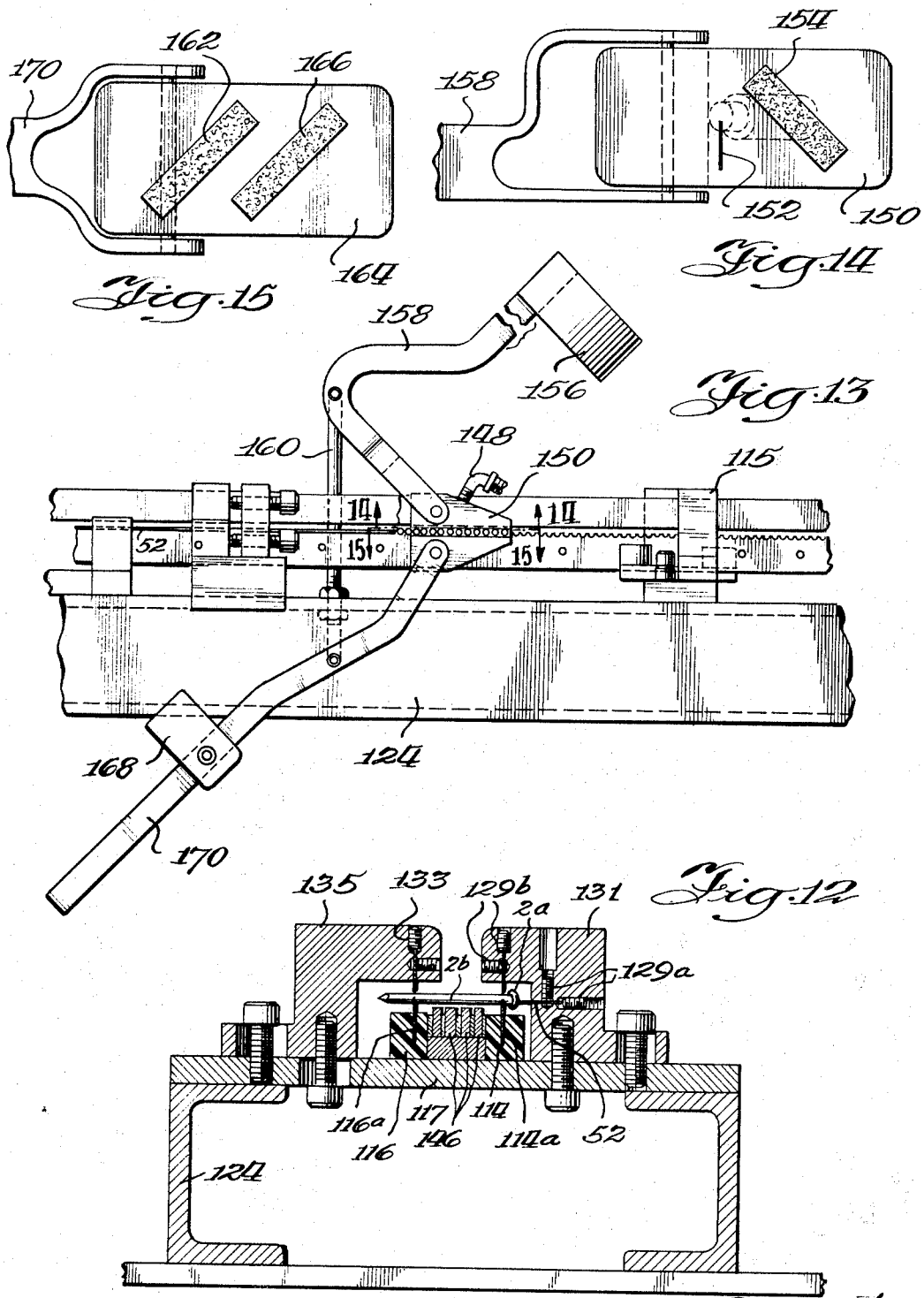

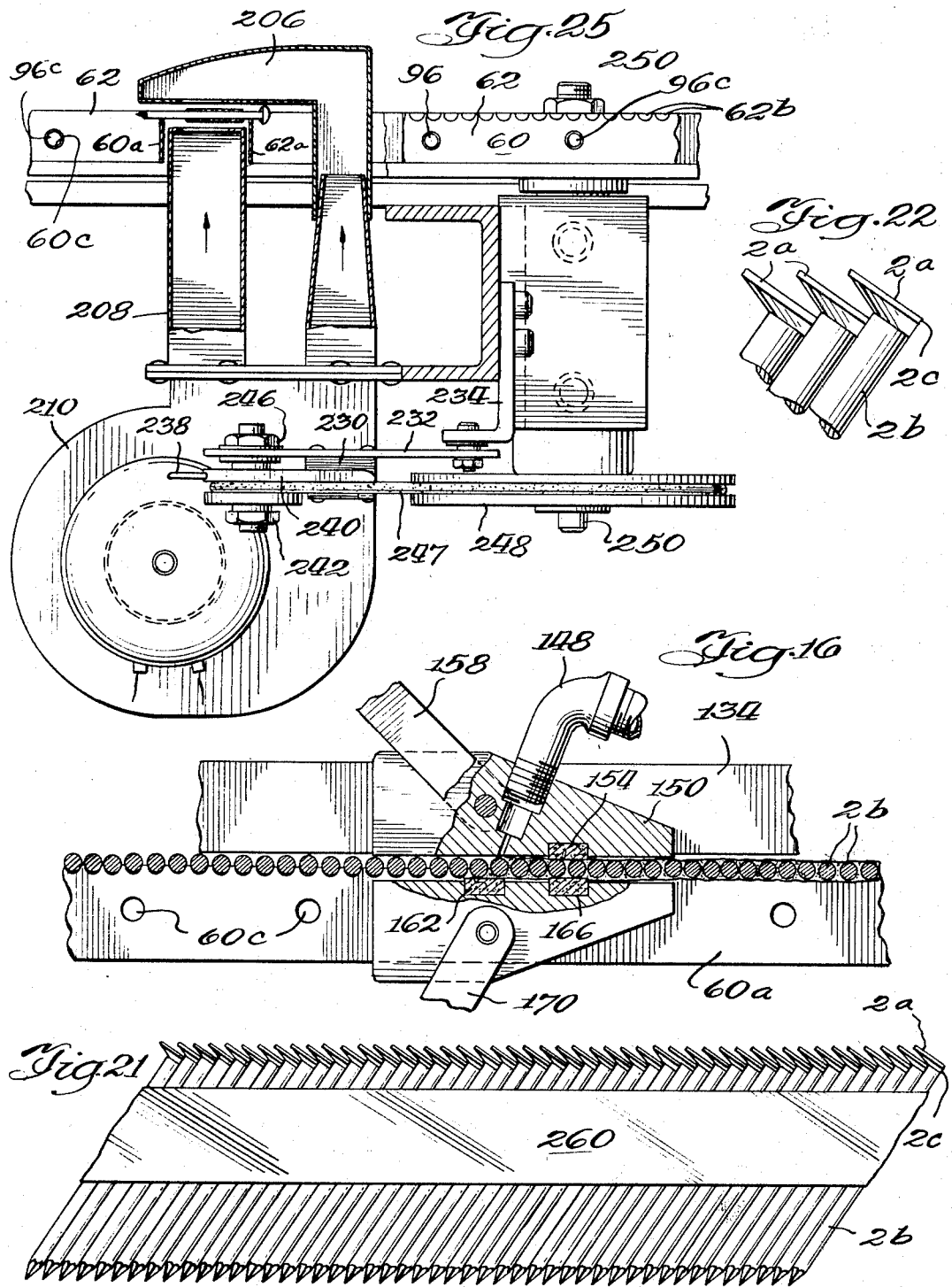

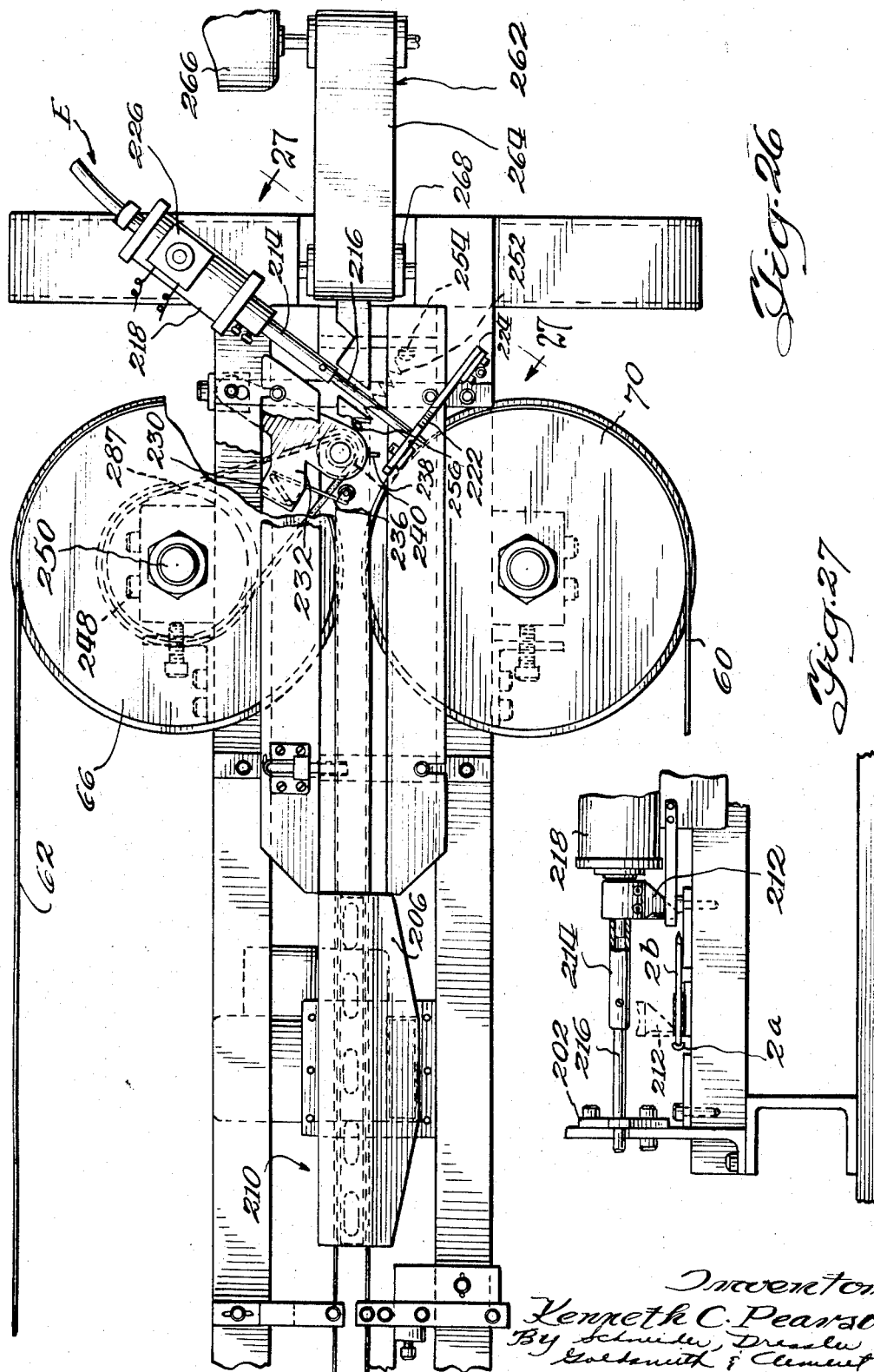

Kenneth C. Pearson, Glenview, Ill., assignor to Signode Corporation, a corporation of Delaware
Continuation of application Ser. No. 303,898, Aug. 22, 1963. This application June 21, 1967, Ser. No. 647,875
18 Claims. (Cl. 156—250)

This application is a continuation of applicant's application Ser. No. 303,898, filed Aug. 22, 1963, now abandoned.

This invention relates to a method for assembling strips of fasteners and to a machine for assembling loose nails into an adhered strip for use in a nail driving tool.

Both manual and pneumatically operated fastener driving tools have been used to drive fasteners such as staples and T-nails. More recently, these tools have been designed to handle "common" nails that have been slightly modified to permit their use in suitably designed magazines. A tool of this general type is disclosed in Lingle et al. application Ser. No. 152,426, filed Nov. 15, 1961, now U.S. Patent No. 3,106,136, assigned to the assignee of the present invention.

The heads of the nails in question are modified so that the shanks of adjacent nails can be juxtaposed. One such modification consists of a nail head having a portion taken along a chord line that is tangent with a projection of the nail shank. With this design, the adjacent nails can be assembled with their heads overlapped in a stepped relationship and their shanks disposed in abutting relationship throughout substantially their entire length. By assembling the nails in this way, an adhered row of nails can be made whatever length desired. The elongated strip can then be cut into strips of suitable lengths for use in a magazine of a pneumatic fastening driving tool, or the like.

The nail shanks are subsequently bonded together by an adhesive which makes for a very flexible yet very strong stick of nails that can withstand rough usage without breaking. This permits the magazine to be loaded at an appreciable speed without fear of the strip breaking into little pieces. To further insure against breakage of the nail strip, it may be reinforced along its length one one or both sides, as desired, by a thin synthetic plastic film that is superimposed over the adhesive when in a liquid state.

The method and machine hereinafter described will be directed toward the assembling of strips of the aforementioned type of slightly modified "common" nails, but it should be understood that the advantages of the invention may be utilized in assembling strips of nails or fasteners of other configurations.

There is descirbed hereinbelow one embodiment of a machine in which nails received at random are first aligned into nested rows, then adhered together and finally cut into strips suitable for use in a fastening tool. All the operations are effected automatically so that labor operations are kept at a minimum.

A fastener assembling machine forming an illustrative embodiment of the present invention is designed to handle common nails in which the head has been shaved on one side thereof to where it is tangent with a projection of the nail shank. The head of the nail when so formed resembles a "half-moon," which configuration permits assembly of the nails in strip form.

The apparatus for assembling an adhered strip of these nails includes a vibratory feeder that lines up nails in a row and directs them into a downwardly extending track. The track is designed so that the nails disposed therein will be similarly oriented. The shank and co-extensive straight head portion of the nail engages one wall of the track and the radially extending portion of the head engages the top of the other wall of the track.

Intermediate the ends of the track, there is provided a solenoid operated device that controls the movement of the nails in the track to further orient the nail heads so that the nail heads overlap each other in a tiered manner.

The heads of the nails in the track are overlapped in a tiered manner, but the nails are not nested since the straight section of the head is not placed in contact with the shank of the adjacent nail. In this arrangement, the shanks of the adjacent nails are spaced apart by an amount equal to the radially extending portion of the nail head. To direct the nails into the proper nested relationship on the conveyor where they are to be adhered together, the track defines at its lower end a curved guide section. The guide section is designed so that the nails therein are moved from the vertical to the horizontal position. During this movement, the nail heads remain tiered, but the pointed ends of the adjacent nails converge. The track, and thus the nails exiting from the guide section are angularly disposed relative to the direction of movement of the conveyor on which they are to be located so that when they are placed thereon they will nest. That is to say, when the nails are deposited on the conveyor, the heads will overlap each other in a stepped relationship and shanks will be disposed parallel to each other.

The conveyor supports the nails in their prescribed relationship and moves them along from station to station where they are adhered together into an elongated row and subsequently cut into short strips. The conveyor includes a pair of looped notched straps that extend substantially parallel to each other. Each of the straps extends around a pair of longitudinally spaced sprockets that define the extreme ends of the conveyor. The adjacent runs of the straps are spaced apart a distance less than the length of the nail shank and form the supports for the opposite end portions of the nail shanks. The straps are driven by a motor through suitable gearing mechanism connected to the shafts to which the drive sprockets are secured.

The notches formed in each of the straps are generally semicircular, and the diameter thereof is slightly larger than the diameter of the nail shank. Since the nails placed on the conveyor are nested and angularly disposed relative to the direction of movement of the conveyor, the end portion of the nail shank is located in a notch of one of the straps that is several notches forward of the one in which the portion of the shank adjacent the head end is located. The angle at which the nails are located on the notched straps is determined by the gun magazine in which it is to be used and this angle is critical to prevent jamming of the nail in the driving chamber and keep the driver blade from picking up more than one nail. In this position, the nail heads will be overlapped, and the shanks, although parallel, will be spaced apart slightly. The spacing and angular relationship between the nail shanks can be varied by longitudinally moving one of the straps relative to the other when the conveyor is not operating, if such is desired.

To facilitate accurate positioning of the nails in the notches of the straps, a plurality of magnets are located at the receiving end of the conveyor. There are also provided suitable guide means at the juncture of the exit end of the track and the nail receiving end of the conveyor to further insure proper positioning of the nail on the notched straps.

The continuously operating conveyor moves the nested nails disposed thereon to a first station where an adhesive is applied to the nails. The adhesive flows along the upper surface of the nails and through the spacing between the nails against a wiper pad biased against the undersurface of the row of nails. The pad spreads the adhesive so that the row of nails will be supplied with adhesive on both sides thereof.

While the invention is not limited to a specific adhesive, one that has been used successfully contains a solvent to provide for easy flowing of the adhesive when it is being applied to the nails. With such an adhesive, as is the case in the present machine, a hot air blower is employed to carry off the solvent after the adhesive has been applied.

After the adhesive is applied and the solvent blown off, one of the adjacent parallel runs of a notched strap is moved toward the other to place the nail shanks into abutting relationship and locate them at the correct angle for use in the magazine of a fastener driving tool. This makes for a tight, compact strip of nails having a strong bond between the shanks. The closely knit adhered row of nails may then be passed under a heater, where the adhesive is cured. The properties of the adhesive selected include one which permits a swinging connection between adjacent nails. This eliminates the problem of brittleness common with current sticks of adhered fasteners.

To further insure against separation of the nails, a plastic tape is applied along both sides of the adhered row of nails. In the illustrated embodiment, a Mylar tape is used which is applied when the adhesive is softened by heat. However, other tapes, such as "pressure sensitive" tapes, could be used. Thus, if the adhesive between two adjacent nails cracks, the strip will be retained intact by the tape superimposed over the adhesive. This taping is accomplished by providing a roll of tape adjacent opposite sides of the nail strip and attaching it to the adhesive previously deposited on the nail row.

The adhered and taped strip of nails, which is still relatively hot due to the application of heat to cure the adhesive, is then cooled by an appropriately positioned cooling system.

The nails, although in adhered form, are still in one continuous strip which must be cut into strips of a predetermined length to fit into a magazine of a nail gun. This, of course, can be done in any number of ways as, for example, by an automatically operated knife assembly located adjacent the exit end of the conveyor. The knife assembly includes a knife disposed parallel to the line of contact between adjacent nail shanks so that when it is actuated, it will sever the tape and adhesive between two adjacent nails to cut the elongated row into strips of a predetermined length. The knife may be controlled by a switching mechanism that is actuated in accordance with the movement of one of the notched straps to insure that the elongated nail row is cut into identical strips of a given length. After the strips are cut off they are then emptied into a container, or other suitable receptacle.

The foregoing advantages and numerous other features and advantages of the invention will be more readily understood and appreciated in the light of the following specification, taken in conjunction with the accompanying drawings, in which there is disclosed an illustrative embodiment of the invention, in which:

FIGURE 1 illustrates a plan view of the machine;

FIGURE 2 is an enlarged plan view of the nail receiving end of the conveyor;

FIGURE 3 is an elevation view illustrating the mechanism for controlling the movement of the nails down the track;

FIGURE 4 is a view similar to FIGURE 3, but with the mechanisms in different positions;

FIGURE 5 is a cross-sectional view taken along lines 5—5 of FIGURE 3;

FIGURE 6 is a view taken on lines 6—6 of FIGURE 2 and shows the exit end of the track illustrating how the nails are disposed on the conveyor;

FIGURE 7 is a view showing the drive for the conveyor;

FIGURE 8 is a view taken on lines 8—8 of FIGURE 2 illustrating the connection between a drive sprocket and a notched strap;

FIGURE 9 is a view taken on lines 9—9 of FIGURE 2 showing the guides provided for the straps and nails;

FIGURE 10 is an enlarged sectional view of the strap and nail guide of FIGURE 9;

FIGURE 11 is a view similar to FIGURE 9 taken on lines 11—11 of FIGURE 2;

FIGURE 12 is a view taken on lines 12—12 of FIGURE 2 and shows the position of the magnets relative to the nail and conveyor guide means;

FIGURE 13 is an elevation view illustrating the apparatus for applying adhesive to the row of spaced nails;

FIGURE 14 is a view of the upper glue block, taken along lines 14—14 of FIGURE 13;

FIGURE 15 is a view of the lower glue block, taken on lines 15—15 of FIGURE 13;

FIGURE 16 is a cross-sectional view taken through the upper and lower glue block assembly;

FIGURE 17 is a plan view showing the nails in spaced relationship to permit the adhesive to flow between adjacent nail shanks;

FIGURE 18 is a cross-sectional view taken along lines 18—18 of FIGURE 17;

FIGURE 19 is a view showing the notched straps moved close together, wherein the nail shanks are in abutting relationship;

FIGURE 20 is a cross-sectional view taken along lines 20—20 of FIGURE 19;

FIGURE 21 illustrates a finished strip of nails;

FIGURE 22 is an enlarged view showing the relationship between the heads of the adjacent nails in the adhered strip;

FIGURE 23 is a plan view of the tape feeding apparatus;

FIGURE 24 is a side elevation taken on lines 24—24 of FIGURE 23 and illustrating both the upper and lower tape applying assemblies;

FIGURE 25 is a view taken on lines 25—25 of FIGURE 1 illustrating the blower mechanism for carrying off the solvent in the adhesive;

FIGURE 26 is a plan view of the delivery end of the conveyor including the means for cutting the elongated strip into short lengths; and FIGURE 27 is an elevation view of the knife and a portion of the actuating means therefor for cutting the nail strip into sections taken along lines 27—27 of FIGURE 26.

Referring to the drawings and, particularly, to FIGURES 1 and 2, there is shown an illustrative embodiment of a machine comprising, (1) a feeding, aligning, and guiding system A, which takes nails from a feeder and lines them up for disposition on a conveyor in a nested relationship with their heads overlapped and their shanks juxtaposed; (2) a conveyor and drive means therefor B which moves the nails in their nested position from station to station during which the individual nails are adhered together; (3) an adhesive applying system C located adjacent the receiving end of the conveyor for applying an adhesive to the nails; (4) a taping station D for taping the nails; (5) a knife assembly E for cutting the adhered strip into short segments; and (6) an exit conveyor F for directing the short segments into a receptacle.

*Feeding, aligning and guiding mechanism A*

As previously indicated, the nails 2 assembled by this machine are of the "common" variety and differ therefrom only in that one side of the generally circular head 2a has been shaved off along a chord line 2c that is substantially tangent to a projection of the nail shank 2b. The resultant head is in the shape of a "half-moon."

The shaved nails 2 are dumped into a hopper 4 of a vibratory feeder 6 which could be any one of a number of those commercially available. The feeder 6 locates the nails 2 in a row and directs them into a suitable orientating mechanism (not shown) secured to the hopper 4 from where they are directed into a track assembly 8.

The track assembly 8 consists of a pair of downwardly extending parallel plates 10, 12 between which the nail shanks 2b move. The plates are spaced apart a distance substantially equal to the diameter of the nail shank 2b, but less than the shortest diameter of the nail head 2a, so that the nail cannot drop between the plates. As shown in FIGURE 5, plate 10 extends above plate 12, so that the nails as received from the orientator are retained in the track with the shank and chord portion of the nail resting flush against plate 10 and the oppositely disposed, radially extending, overhanging head portion resting on top of plate 12, or on top of the head of an adjacent nail. Thus, the nails entering the track will have their head portions similarly disposed, but overlapping, and their shanks parallel but spaced apart by the width of the radially extending head portion.

In order to locate the nails on the conveyor in a nested arrangement, they must first be positioned in the track 8 with their heads 2a in a tiered relationship. That is to say, the head of any given nail in the track must overlap the head of the nail that preceded it down the track. To obtain this relationship, a solenoid operated plunger assembly 14 is provided intermediate the ends of the track. The plunger assembly 14 accomplishes the desired result by spacing the movement of the nails down the track so that the nails are given sufficient opportunity to assume the desired position, which they will do because of the downward inclination of the track. The plunger assembly 14 includes a solenoid 16 that operates to move plunger 18 into and out of the space 20 between the plates 10, 12. When the plunger 18 is moved into space 20, it contacts the nail shanks 2b to stop their downward movement until the preceding nail has had sufficient time to become properly oriented. The operation of solenoid 16 is controlled by a switch 22 that includes a resilient sensing finger 24 located in the space 20 downstream of the plunger 18. When the sensing finger 24 is contacted by a nail shank, it is moved to the position shown in FIGURE 4 to energize the solenoid 16 to move the plunger 18 into the space 20 and halt the flow of nails in the track. After the nail has passed, the sensing finger springs back (see FIGURE 3), and the plunger 18 is retracted to allow succeeding nails to move down the track. This interconnection between switch 22 and solenoid 16 results in an intermittent flow of nails down the track, which action permits the nails to assume the required position.

There is also located adjacent the track a vibrator 26 which facilitates movement of the nails down the track.

The lower end of the track assembly 8 leading to conveyor 28, the details of which will be described hereinafter, consists of a pair of non-magnetic plate members 30, 32 that are secured to the lower ends of the track members 10, 12, respectively. These plates 30, 32 comprise the lower or exit portion of the track and define a curved track section 34 within which the row of nails is moved in the same plane from the vertical to horizontal positions. The curved track section is designed so that during the movement of the nails therein, the nail heads remain tiered, but the adjacent shanks converge (see FIGURE 6). The nails are prevented from moving outwardly from the track by a non-magnetic plate 3b connected to plate 30 that covers the nail heads 2a. The plates 30, 32, 36 are angularly disposed relative to the direction of movement of the conveyor 28, which angular disposition is required in order to place the nails on the conveyor with their heads nested and their shanks juxtaposed (see FIGURES 1 and 2).

Referring particularly to FIGURE 6, there are shown some of the details of the exit end of the curved track section, which details insure that the nails are properly positioned on the conveyor. This structure includes a pair of vertical guides 42, 44 disposed adjacent the head and tip end of the nail shank to adjust the clearance in the track. Disposed intermediate these supports 42, 44 are a pair of rollers 46, 48 to permit clearance of jammed or bent nails that are mounted on a shaft 50 journaled at their ends in supports 42, 44.

The nails are properly positioned on the conveyor by a longitudinally extending guide plate 52 disposed adjacent the entrance end of the conveyor and extending substantially the full length thereof.

*Conveyor and drive means therefor B*

The conveyor 28 onto which the nails are emptied from the track 8 receives and retains the nails in a nested relationship and moves them past a series of stations, where (1) an adhesive is applied; (2) the adhesive is cured; (3) the nails are taped when the adhesive is still in a liquid form; (4) the taped and adhered assemblage is cooled; and (5) the adhered row is cut into short sections. The structural details of this conveyor and the mechanism for driving same are described hereinafter.

The portion of the conveyor system that carries the nails consists of adjacent, substantially parallel, runs 60a, 62a of synchronously driven notched straps 60, 62 that are spaced apart an amount less than the length of the nail shanks that are to be adhered together. The notches 60b, 62b of the straps 60, 62, respectively, are generally semicircular and have a diameter slightly larger than the shank (see FIGURE 18). However, the nail shanks are received and supported in an angularly disposed position relative to the direction of movement of the conveyor with the result that the cross-sections of the nail shanks are elliptical and thus the nails will not come to rest in the position shown dotted in FIGURE 18.

As illustrated in FIGURE 17, the nails, when received from the guide track are, by way of example only, disposed at an angle of approximately 55° to the direction of movement of the conveyor. In this position, the heads 2a are overlapped in a stepped relationship, and the shanks are slightly spaced apart to permit the flow of adhesive therebetween and to give the nails more time to fall into the notches. The elliptical cross-section of the nail shank taken at run 60a (FIGURE 18) has a major diameter that exceeds that of the notch and results in the nail being supported on the upper edges of the notch. This design makes for positive positioning of the nails on the conveyor and prevents jamming thereof.

After the adhesive has been applied, the strap section 62a is moved closer to strap section 60a to decrease the angle between the nail shanks and the direction of movement of the conveyor. In this position, as shown in FIGURE 19, the adjacent nail shanks contact each other along substantially their entire length. When the nail shanks are moved in this direction, the cross-section of the nail shank taken along strap 60a while remaining elliptical has a slightly larger major diameter which results in the shanks 2b abutting each other (see FIGURE 20).

The notched strap 62 is disposed around a pair of sprockets 64, 66 located at the opposite ends of the conveyor 28 and the notched strap 60 extends around sprockets 68, 70 located adjacent sprockets 64, 66, respectively. The notched strap 60 is substantially parallel to notched strap 62 and is driven in synchronism therewith to maintain the nested nails in their proper position. The drive sprockets 64, 68 for the straps 60, 62, respectively, are connected to the upper end of their respective drive shafts 72, 74. The drive shafts 72, 74 are rotated by identical interengaging spur gears 76, 78 secured to their respective lower ends. The spur gear 76 is driven by a motor 80 through intermediate gears 82, 84, 86 (see FIGURES 2 and 7). Thus, operation of motor 80 will rotate sprockets 64, 68, and notched straps 60, 62 in synchronism and at exactly the same speed.

It is essential that the notched straps be prevented from slipping relative to their sprockets since the relationship between the notches 60b, 62b of the parallel runs 60a, 62a must be accurately maintained to retain the nails in their proper position throughout their travel on the conveyor. To this end, the notched straps 60, 62 are provided with a plurality of uniformly spaced holes 60c, 62c throughout its length. These holes are designed to receive circumferentially spaced pins 96 that are press-fitted into the drive sprockets 64, 68 for both notched straps (see FIGURE 8). Since a portion of each notched strap is at all times held against sliding movement relative to its respective drive sprocket by the pins 96, the preset relationship between the parallel runs 60a, 62a that support the nails will always be maintained.

The relationship between the notched straps can be adjusted before starting the conveyor by a slight rotation of the sprocket 64 relative to the shaft 72 to which it is secured. This is accomplished by loosening the nut 98 that secures the sprocket 64 to the shaft 72 and adjusting the position of the sprocket relative thereto by screws 100, 102 threaded into plate 104 keyed to the shaft 72.

The generally parallel strap sections 60a, 62a on which the nails are moved from station to station are guided throughout its length by a plurality of longitudinally spaced guide means, as illustrated in FIGURES 1, 2, 9, 10, 11 and 12. The straps are guided adjacent their drive sprockets by a pair of spaced guides 106, 108 and a pair of roller assemblies 110, 112. As shown in detail in FIGURES 2 and 12, the straps then pass through slots 114a, 116a formed in guide blocks 114, 116 secured to base plate 117. Longitudinally spaced from guide blocks 114, 116 are additional pairs of guide blocks 118, 120, respectively, that are secured to a base plate 122 which is connected to the undercarriage 124 of the conveyor 28. Also, as shown in FIGURES 2 and 13, roller assemblies 115 located intermediate the ends of the conveyors are provided for guiding the strap sections 60a, 62a.

In addition to the guide means for the notched straps, there are also provided suitable guides for maintaining the nails thereon in their proper horizontal relationship and from overlapping adjacent nails. The heads of the nails are guided by a longitudinally extending horizontal plate 52 that is supported by suitably positioned brackets. For example, the plate 52 is fixed in place at one place to a bracket 128 by threaded plugs 130, 132 (see FIGURE 9).

The nails are prevented from overlapping adjacent nails by vertically positioned guide plates 134, 136. The plate 134 is in alignment with strap section 60a and is supported in bracket 128 by threaded plugs 138, 140. The plate 136 is similarly supported relative to strap section 62a and is connected to bracket 142 disposed adjacent bracket 128. The brackets 128, 142 are bolted to the conveyor undercarriage 124 (see FIGURE 9).

The horizontal and vertical guides for the nail row are supported a longitudinally spaced places along the length of the conveyor. One such support area is shown in FIGURE 11. Briefly, transversely spaced brackets 119, 121 support guides 134, 136 by screws 123, 125, respectively. The horizontal guide 52 is fastened to bracket 119 by screw 127. The brackets are in turn secured to the conveyor undercarriage. The support for the horizontal guide 52 and vertical guides 134, 136 at the entry end of the conveyor are illustrated in FIGURE 12. The support at this point is very similar to that shown in FIGURE 9 in that threaded plug 129a secures the horizontal guide 52 in place and threaded plug 129b clamps vertical guide 134 in bracket 131. Similarly threaded plugs 133 are provided to secure guide 136 relative to bracket 135.

As previously mentioned, the nails are angularly disposed on the notched straps relative to the direction of movement of the conveyor. This relationship is preset so that the adjacent nail heads overlap and their shanks are slightly spaced apart. As will be discussed hereinafter in detail, this spacing is provided to permit the application of adhesive to the undersurface of the nail row and give the nails more time to fall into the notches. Subsequent to the applying of the adhesive, the nail shanks are moved together to provide for a tighter bond between the adjacent shanks. This is accomplished by moving the nails through a small angle in the direction of the movement of the conveyor. This movement is effected by moving the strap section 62a toward strap section 60a, which is accomplished by moving strap section 62a through a guide 144 schematically illustrated between FIGURES 17 and 19. It is to be noted that although the shanks are juxtaposed, as shown in FIGURE 19, the nail heads, while in a nested stepped relationship, are slightly spaced apart, as shown in FIGURE 22.

It remains to note that the nylon blocks 114, 116 located at the entrance end of the conveyor support therebetween a plurality of magnets 146 that aid in depositing the nails on the conveyor and keep the heads from rotating.

Adhesive applying system C

The nested nails are first moved by the conveyor 28 to a station where an adhesive is applied for adhering the nails together. The adhesive is applied in the liquid state against the upper surface of the nail row. The adhesive then flows through the spaces between the adjacent nail shanks to the undersurface of the nail row. An adhesive that could be used is a saturated linear terephthalate copolyester adhesive which contains a solvent to obtain the proper flowing action. Adhesives such as modified synthetic rubber types, or other polyesters, could also be employed, if desired. An adhesive such as a thermoplastic material applied in the molten state, which did not require a solvent, could also be used.

The use of such an adhesive makes for a flexible yet very strong stick of nails which can withstand rough usage without breaking. The type of adhesive selected should in addition to strength and resiliency have less inherent cohesive strength than the adhesive bond to the nails. This latter property would result in a part of the adhesive surrounding each nail sticking thereto thus eliminating the possibility of any given nail being left with all the adhesive surrounding it, which could bring about clogging of the tool used for driving the nails.

The adhesive is stored in a reservoir (not shown) which is connected through a conduit 148 to an upper block 150. The adhesive flows through a slot 152 in the block onto the upper surface of the nail shanks and through the spaces formed between adjacent nail shanks. The glue block 150 includes a wiper pad 154 located forward of the slot 152 which functions to more evenly distribute the adhesive over the shanks of the nails and into the spaces formed therebetween. The upper block 150 and associated wiper pad 154 are biased into engagement with the upper surface of the nail row by a weight 156 connected to one end of a crank arm 158. The crank 158 is connected at its other end to the block 150 and is pivotally mounted at an intermediate point to a rod 160 secured to the conveyor frame.

The adhesive that flows between the nail shanks is directed against a wiper pad 162 located in a lower block 164. A wiper pad 166 located forward of the pad 162 aids in the even distribution of the adhesive along the undersurface of the row of nail shanks. The lower block 164 is retained in place against the underside of the nail row by a weight 168 secured to the opposite end of a lever arm 170 pivotally connected at an intermediate point to the rod 160.

After the glue has been applied (which is a continuous operation), the adhered nails are moved by the conveyor to a second station where a hot air blower 172 for carrying off the solvent contained in the adhesive to give it the desired flow characteristics is located. This is done to reduce the amount of time necessary to cure the adhesive by a curing means located at a subsequent station of the conveyor.

After the adhesive has been applied, and the solvent blown off, the nail shanks are moved closer together by moving notched strap 62 toward notched strap 60. With the nail shanks in an abutting relationship (see FIGURE 19), there results a tighter bond between the adjacent nails and reduces the likelihood that the adjacent nails will be separated during subsequent handling.

The adhered row of nails is then passed under a heater 174 where the adhesive is cured to fix the adhesive to the nails. The blower and heater are suitably secured to the conveyor frame.

*Taping mechanism D*

The row of nails is then moved to a taping station, where a tape such as a thin Mylar polyester film 175 is simultaneously applied along both sides thereof. The Mylar tape is applied when the adhesive is still in a sticky condition and assists in retaining the nails in strip form.

The taping assembly consists of a pair of taping rolls 176, 178 that are rotatably mounted on opposite ends of a vertically extending support member 180 which is in turn secured to the undercarriage of the conveyor (see FIGURES 23 and 24). The upper taping roll 176 is rotatably mounted on a shaft 182 connected at its outer end to the vertical support 180. The tape is guided onto the nail row over relatively small rollers 184, 186 and then over a larger roller 188. The three rollers 184, 186, 188 are rotatably supported on a downwardly inclined bracket 190 that is pivotally mounted on the shaft 182. The bracket 190 is resiliently biased against the roll 176 by a collar 192 that is held in frictional engagement with the bracket 190 by a compression spring 194.

The lower roll of tape 178 is rotatably mounted on a shaft 194 journalled in a bracket 180 and the end of the tape from roll 178 extends over a plurality of rollers 198, 200, 202 rotatably supported by an upwardly extending plate 204. The plate 204 is fixed relative to the shaft 194, and once positioned, will be held in place against the underside of the nail row.

After the tape has been applied, the conveyor moves the adhered and taped nails between a pair of blower ducts 206, 208 that direct air against both sides of the nail strip to cool and set the adhesive adhering the strip of nails so that it can be subsequently handled. The blower mechanism 210 for supplying the cool air is shown in FIGURE 25.

*Knife assembly E*

After the adhered and taped row of nails passes the blower within which it is cooled, it is in condition ready to be cut into suitable lengths for use in a nailer magazine. The row of nails is severed into strips of a given length by a knife assembly disposed adjacent the end of the conveyor 28. The knife 212 is actuated in response to the movement of the notched straps so that the strips cut from the elongated row will all be the same length. The details of the knife 212 and support therefor, and the switch controlled hydraulic system for regulating the movement of the knife are not a critical part of the present invention since various cutting devices could be used.

As shown in FIGURE 27, the knife 212 is secured to a sleeve 214 which is in turn pinned to a piston rod 216 that extends outwardly from the fluid actuated cylinder 218. The other end of rod 216 is guided in a groove in a depending bracket 222 to a frame structure 224 connected to the conveyor undercarriage. The cylinder 218, rod 216, and knife 212 are located adjacent the tip end of the nail shanks and are disposed parallel to a line of contact between adjacent shanks, so that actuation thereof will cut through the tape and adhesive interconnecting adjacent shanks to cut a strip of nails from the adhered row. As will be described in detail hereinafter, the operation of the knife is controlled by the movement of one of the notched straps to effect a timely operation of the knife.

The operation of the cylinder 218 is controlled by a solenoid operated valve control system 226 located at one end of the cylinder 218. Actuation of the solenoid valve system regulates the flow of fluid to the opposite side of the piston controlling the operation of the piston rod 216 to move the knife back and forth across the nail row. The solenoid 226 is in turn controlled by a switch 230 secured to a bracket 232 that is pivotally connected to a support fastened to the conveyor undercarriage. The operation of the switch 230 is controlled by a switch actuator 236. When the switch is closed by the movement of the actuator 236, the solenoid 226 is energized and the cylinder 218 operated to move the knife 212 across the row of nails. The switch actuator 236 is positioned to be engaged by a radially extending finger 238 that extends from a pulley 240. The pulley 240 is rotatably mounted on a stud 242. The stud 242, threaded at both ends, extends through pulley 240 and bracket 232, and connects them together by nuts 244, 246 (see FIGURE 25). The pulley 240 is driven, through belt 247, by a much larger pulley 248 secured to the lower end of the shaft 250 to which sprocket 66 is secured. With this arrangement, the switch 230 will be actuated once during every revolution of pulley 240 which is moved in accordance with the movement of notched strap 62. The diameters of the pulleys 240, 248 will determine the length of the nail strip severed from the nail row.

It remains to note that the belt 247 is maintained taut by a tension spring 252 connected at one end to a conveyor frame member 254 and at its other end to a screw 256 connected to the pivotally mounted bracket 232.

*Exit conveyor F*

A finished stick of nails 260 (FIGURE 32) is now ready to be placed in a nailer magazine. The stick 260, severed from the elongated row, is transported from the strap conveyor to a storage bin disposed adjacent thereto by a separate motor driven conveyor 262. As shown in FIGURE 26, the strip 260, after leaving the notched straps, is disposed on a belt 264 that is driven by an electric mbotor 266. The opposite end of the belt is directed over a roller 268..

The operation of the machine is as follows:

The nails 2 that are dumped at random into the hopper 4 of vibratory feeder 6 are directed into an elongated row and fed into an orientator that empties into the downwardly inclined track assembly 8. The movement of the nails in the track is controlled so that they are placed in a tiered relationship for disposition on a conveyor 28 in a nested array, on which conveyor they are to be adhered, taped together and cut into strips of a preset length.

The track assembly 8 is angularly disposed relative to the conveyor 28 and the lower section of the track is curved to guide the nails from the vertical position in which they first enter the track to the horizontal position in which they leave the track and move on to the notched straps 60, 62 that support the opposite ends of the nail shanks.

The nails disposed on the notched straps have their shanks parallel, but slightly spaced apart, and their heads in nested relationship. The notched straps are continuously driven in synchronism, whereby the relative position of the adjacent nails will be sustained all the time they are in the conveyor.

The conveyor moves the nested nails to a first station C, where an adhesive is applied to both sides of the nails and to the spaces between adjacent nail shanks. At a subsequent station, the solvent contained in the adhesive is carried off by a blower 172 to assist in curing the adhesive which is the illustrated embodiment is accomplished by a heating unit 174. Prior to the nails reaching the heater, the spaces between the adjacent nail shanks are eliminated by moving the nail shanks into abutting relationship. This latter function is accomplished by moving the notched strap 62 closer to notched strap 60. After the nails leave the heater, they pass a taping station D, where a plastic tape is applied to the liquid adhesive on both sides of the nail strip. Tape is positioned against the opposite sides of the adhered strip from a pair of tape rolls 176, 178 located above and below the nail strip, respectively.

The glued and taped strip is then cooled by the circulation of air through ducts 206, 208 by a blower 210 secured to the undercarriage of the conveyor 28.

After the strip leaves the blower, the elongated row is cut into short lengths by a fluid actuated cutting assembly E, the operation of which is controlled by a switch 236 that is in turn actuated in response to a predetermined movement of notched strap 62. Thus, the elongated row will be cut into a strip or sticks of a constant length for use in the magazine of a nailer. The severed sticks are ejected from the conveyor by a separately driven belt assembly located adjacent the end of the conveyor.

Although there is described an illustrative embodiment of the invention in considerable detail, it will be understood that the description is intended to be merely exemplary rather than restrictive as many details may be modified or changed without departing from the spirit or scope of the invention. For example, the conveyor could be used to adhere nails having heads shaped with a notch to permit juxtaposition of adjacent nail shanks. Such a nail is disclosed in United States Patent No. 2,940,081, issued to A. G. Juilfs. In addition, a thermoplastic material applied in a molten state could be used, and the plastic tape could be replaced with a paper tape. Furthermore, a heat sensitive tape having sufficient thermoplastic material secured thereto to not only bond the tape to the nails, but also adhere the nails together, could be used. Such tape would be pressure applied to heated nails and would extend over the nail shanks and extrude therebetween. When such a tape was employed, the nails would be conveyorized, heated and cooled in a manner similar to that described herein. This would eliminate the necessity of providing for a separate application of adhesive. Other modifications could include provisions for periodically leaving out a nail, which would eliminate the necessity of employing a cut-off device.

What is claimed is:

1. A machine for assembling nails into adhered strips comprising a conveyor, said conveyor including a pair of endless nail support members, said nail support members having their adjacent runs disposed substantially parallel and spaced to receive and support the shanks of a plurality of nails, means for driving said members in synchronism, each of said members defining a plurality of notched sections, means for disposing the nail shanks into the notches of said members at an angular relationship relative to the direction of movement of said notched members, whereby the nail heads are overlapped and the shanks are parallel, and means for applying adhesive to said nail shanks to secure the nail shanks together.

2. A machine for assembling nails as described in claim 1, including means for receiving bulk nails and directing the nails to a track assembly, said track assembly being adapted to direct the nails in a row to said conveyor.

3. A machine for assembling nails as described in claim 1, including means for guiding said nail support members in a predetermined path, and means for cutting the elongated strip of nails formed into sections of a predetermined length.

4. A machine for assembling nails in strip form, comprising a conveyor adapted to handle a plurality of nails having enlarged heads and cylindrical shanks, said conveyor including a pair of endless notched nail supporting members, means for supporting said notched nail supporting members adjacent each other with their adjacent runs disposed in substantially parallel relationship and spaced apart a distance less than the length of the shanks, whereby the adjacent runs of the two nail supporting members can support said nails with their heads overlapped and shanks parallel, and means for driving said members in synchronism.

5. In a nail strip assembling machine, a conveyor comprising a pair of substantially parallel notched straps, means for driving said straps in synchronism, said notched straps being designed to support the nails in parallel spaced relationship, means for adhering adjacent nail shanks together, and means longitudinally spaced from the adhering means to move the nail shanks into abutting relationship to assist in the formation of a tight compact adhered strip of nails.

6. A machine for collating nestable nails having enlarged heads and shanks including a conveyor made up of a pair of looped straps having substantially parallel runs, said straps defining notch portions that are constructed and arranged to support said nails in a predetermined angular relationship with their heads located in a stepped arrangement and their shanks disposed parallel to each other, means for driving said straps in synchronism to maintain the angular relationship of said nails, means for adhering adjacent nail shanks together, and means longitudinally spaced from said adhering nails to move one of said notched straps relative to the other to move the nail shanks in the direction of movement of said conveyor whereby the nail shanks are moved into abutting relationship along substantially their full length to provide for a compact adhered strip of nails.

7. In a machine for assembling adhered strips of nails including a conveyor comprising a pair of notched straps disposed in parallel relationship for receiving and supporting a plurality of nails in nested relationship, means for driving said straps in synchronism, and means for adjusting the position of one of the straps relative to the other whereby the angle of the nails disposed on the notched straps can be varied.

8. In a nail strip assembling machine including a conveyor adapted to receive nails in a nested relationship, means for supplying nails to said conveyor with their heads overlapped and shanks parallel comprising a track assembly angularly disposed relative to the direction of movement of the conveyor, said track being constructed and arranged to receive the row of nails in a vertical position and move them into a horizontal position for emptying on the conveyor, and means for controlling the movement of the nails in said track, whereby the nails in said track are properly positioned for nesting on said conveyor.

9. A nail strip assembling machine including means for guiding a plurality of nails each having a shank and an enlarged head having a chord section tangent to a projection of the shank onto a conveyor means constructed and arranged to receive the nails in a nested relationship with their heads overlapping and their shanks juxtaposed, said guide means including a pair of plates defining a track for said nails in which the chord section of the nail head is located against one wall of one of the track members and the radially extending head portion rests on the top of the other track member, means for controlling the movement of the nails down said track, said conveyor comprising a pair of transversely spaced looped notched straps, means for driving said straps in synchronism, and means for adhering said nails together on said conveyor.

10. A conveyor assembly for adhering a plurality of nails into an adhered strip, said assembly comprising a pair of parallel notched straps adapted to receive a plurality of nails having a generally circular head portion and a chord portion tangent to a projection of the cylindrical shank portion, said nails being disposed on said straps with the chord portion in engagement with the shank portion of an adjacent nail, means for adhering the shanks of the adjacent nails together, means for taping the nails together, and means for cutting the elongated strips of nails into short segments.

11. A nail collating machine comprising a track assembly for moving a plurality of nails, having a shank and an enlarged head with a chord portion tangent to a projection of the shank, into a horizontal position with their heads overlapped in a stepped relationship and their shanks juxtaposed, a conveyor comprising a pair of transversely spaced looped straps adapted to receive the nails from said track and defining a plurality of generally semicircular notched portions into which the shanks of said nails are disposed in an angular position relative to the movement of said straps whereby the nails assume said position, means for driving said straps in synchronism, means for applying an adhesive to said nails on said conveyor, means for curing said adhesive, means for taping the row of nails, means for cooling said nails, and means for cutting the elongated row of nails into short segments.

12. A nail strip assembling machine comprising means for receiving bulk nails and directing the nails to an inclined track assembly, said track assembly being adapted to direct the nails in a row with their heads overlapped to a conveyor, said conveyor including a pair of endless nail support members, each of said members defining a plurality of notched sections, said members having their adjacent runs disposed substantially parallel and spaced to receive and support the shanks of a plurality of nails in said notches with the shanks at an angular relationship relative to the direction of movement of said notched members, with the nail heads overlapped and the shanks in parallel, means for guiding said members in a predetermined path, means for applying adhesive and tape to said nails on said conveyor, means for cooling said nails, and means for cutting the elongated strip of nails formed into discrete segments.

13. A method of producing an adhered row of nested nails comprising the steps of locating a plurality of nails on a conveyor with their heads overlapped in a stepped arrangement and the shanks of adjacent nails parallel to each other throughout substantially their full length, moving the conveyor to an adhesive applying section, and applying an adhesive to the nails to bind them together.

14. The method of producing an adhered strip of nestable nails comprising the steps of locating a row of nails on a conveyor with their heads overlapping and their shanks disposed parallel but slightly spaced apart, moving the conveyor to a source of adhesive, applying an adhesive to one side of the row and the spaces between adjacent nails, and moving the nail shanks together to increase the bond between adjacent nails.

15. A method of producing adhered strips of nails comprising aligning a plurality of nails in a row with the heads of the nails overlapped and their shanks juxtaposed on a continuously moving conveyor having notched nail supporting members, applying an adhesive and strips of tape to the shanks of the nails, and cutting the taped adhered row of nails into sections of a predetermined length.

16. A method of producing an adhered strip of nails comprising the steps of receiving bulk nails, directing the nails to an inclined track assembly, directing the nails in a row along said track assembly to a conveyor, supporting said nails within notches defined by said conveyor with the nail heads overlapped in a stepped arrangement and the shanks of adjacent nails parallel to each other throughout substantially their full length, moving said conveyor to an adhesive and tape applying section, applying adhesive and tape to said nails on said conveyor, cooling said nails, and cutting the elongated strip of nails formed into segments of a predetermined length.

17. In a nail strip assembling machine designed to collate nested nails into an elongated adhere array comprising a power-driven conveyor, a row of nested nails on said conveyor, means for adhering the nails together, knife means to cut the row of adhered nails into short sections, motor means for operating said knife means, control means operated by said conveyor means to actuate said motor means whereby the knife means will be operated upon a predetermined movement of the conveyor to cut the adhered row of nails into predetermined lengths.

18. In a machine for assembling nails into adhered strips including a conveyor means defining a plurality of notched sections for receiving and supporting the shank portions of a plurality of nails, means for disposing the nail shanks onto said conveyor in an angular relationship relative to the direction of movement of said conveyor, whereby the nail heads are overlapped and the shanks are juxtaposed, and means for securing the nail shanks together into an adhered strip.

References Cited

UNITED STATES PATENTS

| | | | |
|---|---|---|---|
| 2,511,769 | 6/1950 | Chamberlain | 156—305 X |
| 2,625,287 | 1/1953 | Holt et al. | 156—522 X |
| 3,171,535 | 3/1965 | Harris | 198—131 |
| 3,242,850 | 3/1966 | Adams et al. | 156—522 X |

HAROLD ANSHER, *Primary Examiner.*

EARL M. BERGERT, *Assistant Examiner.*